United States Patent [19]

Pund

[11] Patent Number: 4,649,425
[45] Date of Patent: Mar. 10, 1987

[54] STEREOSCOPIC DISPLAY

[76] Inventor: Marvin L. Pund, 2930 Arlmont Dr., Bel Nor, Mo. 63121

[21] Appl. No.: 819,919

[22] Filed: Jan. 16, 1986

Related U.S. Application Data

[63] Continuation of Ser. No. 516,710, Jul. 25, 1983, abandoned.

[51] Int. Cl.$^4$ ............................................. H04N 13/04
[52] U.S. Cl. ........................................ 358/88; 350/132
[58] Field of Search .................. 358/88, 3; 350/130, 350/131, 132, 143

[56] References Cited

U.S. PATENT DOCUMENTS 2,845,618  7/1958  Huffman ................................. 358/88
4,122,484  10/1978  Tan ....................................... 358/88

Primary Examiner—Howard W. Britton
Attorney, Agent, or Firm—Polster, Polster and Lucchesi

[57] ABSTRACT

A display system is provided which gives an illusion of depth to an observer by generating left and right eye image projections for view by the observer. The device includes an observer tracking system which monitors the position of the observer and adjusts the projected scene perspective as a function of observer head position. In the preferred embodiment, the display system is housed in an enclosure adapted for use in arcade video game devices. The tracking device preferably is a plurality of light sensitive photo cells which are monitored to determine observer position in a predetermined field of view. The left and right image scene perspective is adjusted to accommodate observer positions within that field of view as those positions change.

23 Claims, 10 Drawing Figures

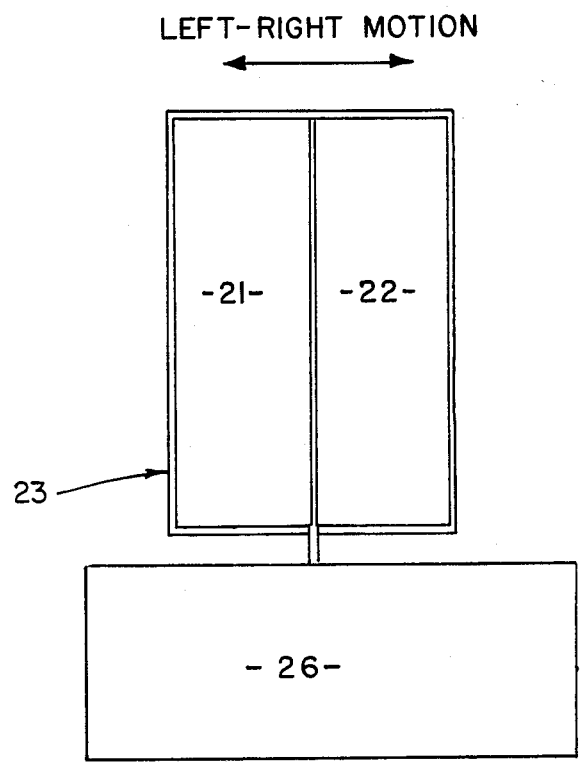
FIG. IB.

STEREOSCOPIC DISPLAY

BACKGROUND OF THE INVENTION

This is a Continuation of Application Ser. No. 516,710, filed July 25, 1983, abandoned.

This invention relates to stereoscopic display systems, and more particularly, stereoscopic displays in which the images are provided by CRT displays. While the invention is described in particular detail with respect to arcade video games or conventional home entertainment devices, those skilled in the art will recognize the wider applicability of the inventive principles disclosed hereinafter. In particular, the invention has application wherever a three dimensional display is useful or desirable.

The prior art reveals many devices for displaying stereoscopic imagery in a fashion acceptable to general viewing audiences. While these prior art devices worked for their intended purposes, they suffer from a variety of drawbacks which severely limit their market potential. In general, the three-dimensional effect of prior art designs is produced by requiring the observer to position his head properly with respect to certain viewing ports; wearing filtering or light modulating glasses; or wearing a helmet, or similar headgear having the display mounted to it. The discomfort and inconvenience imposed upon an observer using these various prior art devices, especially when compared with the viewing ease offered by standard TV (CRT) displays, has contributed to the lack of wide acceptance of these systems.

Previous stereoscopic display systems also have suffered from poor image quality when compared to standard TV displays. For example, some devices have used color separation techniques to display a red image and a green image to the respective left and right eyes of an observer. Such a system design produces an unnatural color image presentation. Other systems use light polarization techniques to display stereo imagery. In this latter system design form, movement of the observer's head causes the polarized filters, especially those that are worn as glasses, to become ineffective and a confusing double image is displayed.

In yet another technique, a set of light modulating filters is placed in front of both eyes of an observer. The two light modulating filters are alternately changed from transparent to opaque in unison with the display, generally a single cathode ray tube (CRT), adapted to provide the corresponding left and right images required for stereo display. This method and its implementation causes a noticeable flicker effect.

Still other devices lack sufficient resolution because they use only half of the standard NTSC video bandwidth for each of two separate display channels.

The display system disclosed hereinafter overcomes these prior art deficiencies by providing a stereographic video display that requires no head mounted viewing aids. The system permits freedom of movement for a viewer or observer within an extended viewing envelope. Full color stereoscopic video display is provided to both eyes without the need for polarizing glasses. The design includes a tracking system that locates a viewer in three-dimensional space with relation to the display system. Viewer location is utilized to control the perspective of the projected scene presented to the observer. The system is particularly well adapted for providing stereoscopic displays in arcade game environments, although an embodiment for conventional home TV presentation in a stereoscopic system is also disclosed. As indicated above, other applications will occur to those skilled in the art. In particular, certain displays used for medical diagnosis are well suited for my invention.

One of the objects of this invention is to provide a display device which provides a stereoscopic display to an observer.

Another object of this invention is to provide a stereoscopic display that does not require the use of head mounted viewing aids.

Another object of this invention is to provide a stereoscopic display that exhibits resolution comparable to standard NTSC broadcast video displays.

Another object of this invention is to provide a relatively low cost stereoscopic display system.

Another object of this invention is to provide a display system in which head movement of the observer is tracked and utilized to adjust the image presented to the observer.

Other objects of this invention will be apparent to those skilled in the art in light of the following description and accompanying drawings.

SUMMARY OF THE INVENTION

In accordance with this invention, generally stated, a display system includes first and second image generating means adapted to provide a desired image. The desired image is projected along a control path toward an observer. A control means is provided in the path for adjusting the image as projected along the path, depending upon the position of the observer. A tracking device locates the position of the observer and generates a signal which is used to adjust the image presented to the observer through the control means.

BRIEF DESCRIPTION OF THE DRAWINGS

In the drawings.

FIG. 1B is a view taken along the line 1B—1B of FIG. 1;

DESCRIPTION OF THE PREFERRED EMBODIMENT

Figure 1:
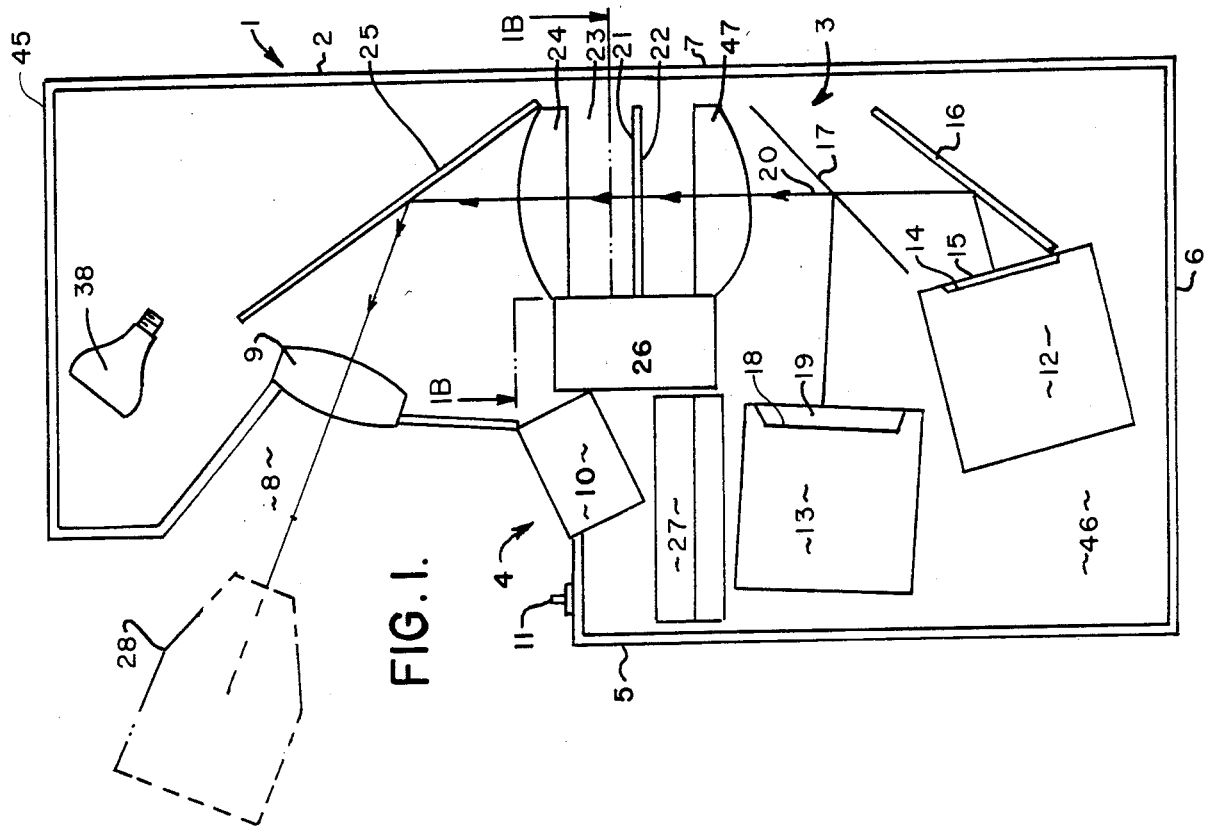
FIG. 1 is a side view in side elevation of one illustrative embodiment of display system of this invention, a side panel of a suitable enclosure being removed for illustrative purposes.

Reviewing now to FIG. 1, reference numeral 1 indicates one illustrative embodiment of display system of this invention.

The display system 1 includes an enclosure 2, an image projection system 3, and an observer tracking system 4.

The enclosure 2 is conventional and generally includes a front wall 5, a bottom 6, a back wall 7, a top 45, a left side wall 46 and a right side wall. The right side wall is not shown in FIG. 1 for ease of illustration. The enclosure 2 is indented along its front wall 5 at a game display area 8. Mounted in the game display area 8 is a view lens 9, a tracking means 10, and at least one control device 11. The control device 11 is conventional and is intended to operate in conjunction with a particular display game observable at the lens 9. Conventional "joy sticks", paddles, or buttons may be utilized, for example.

As indicated above, the embodiment of FIG. 1 preferably represents an arcade display system. While a particular enclosure is shown and described, those skilled in the art will recognize that a wide variety of enclosure designs are compatible with the broader aspects of this invention.

The image generating system 3 includes a first image generator 12 and a second image generator 13. The image generators 12 and 13 comprise image generating means for the image generating system 3 and preferably are conventional CRT display monitors. Other image generating means are compatible with the broader aspects of this invention. In any event, the image generator 12 includes a front face 14 having a sheet polarized filter 15 mounted on the face 14. The image generator 12 projects a raster scan image that has the correct perspective required for stereo viewing when viewed through the left eye of an observer. The filter 15 is oriented to pass only vertically polarized light. The image generated by the generator 12 is reflected by a mirror 16 toward a beam splitter 17.

The image generator 13 likewise is a CRT display, having a front face 18. A sheet polarized filter 19 is mounted to the face 18. The image generator 13 projects a raster scan that has the correct perspective required when viewed through the right eye of an observer. The filter 19 is oriented to pass only horizontally polarized light. The horizontally polarized light passed by the filter 19 also strikes the beam splitter 17.

The beam splitter 17 is a 50/50 splitter, that is to say, half of the light or electromagnetic wave energy from each of the generators which is incident upon the beam splitter is transmitted by the beam splitter 17 and the other half is reflected by the beam splitter 17. Light transmitted by the beam splitter 17 from image generator 12 is projected along a path generally indicated by the numeral 20. Light reflected by the beam splitter from image generator 13 also is transmitted along the path 20.

The light that is transmitted along the path 20 passes through a lens 47 that collimates the light from the respective image generators 12 and 13.

Interposed in the path 20 downstream of the lens 47 are a pair of aperture control polarizers 21 and 22. The polarizers 21 and 22 are movably mounted with respect to the path 20, as later described in greater detail. The relationship of the polarizers 21 and 22 are best seen in FIG. 1B. After passing through the polarizers 21 and 22 of an aperture control means 23, the light passes through a lens 24, is reflected by a second mirror 25, and forms the desired left and right eye images at the display lens 9.

Figure 2:
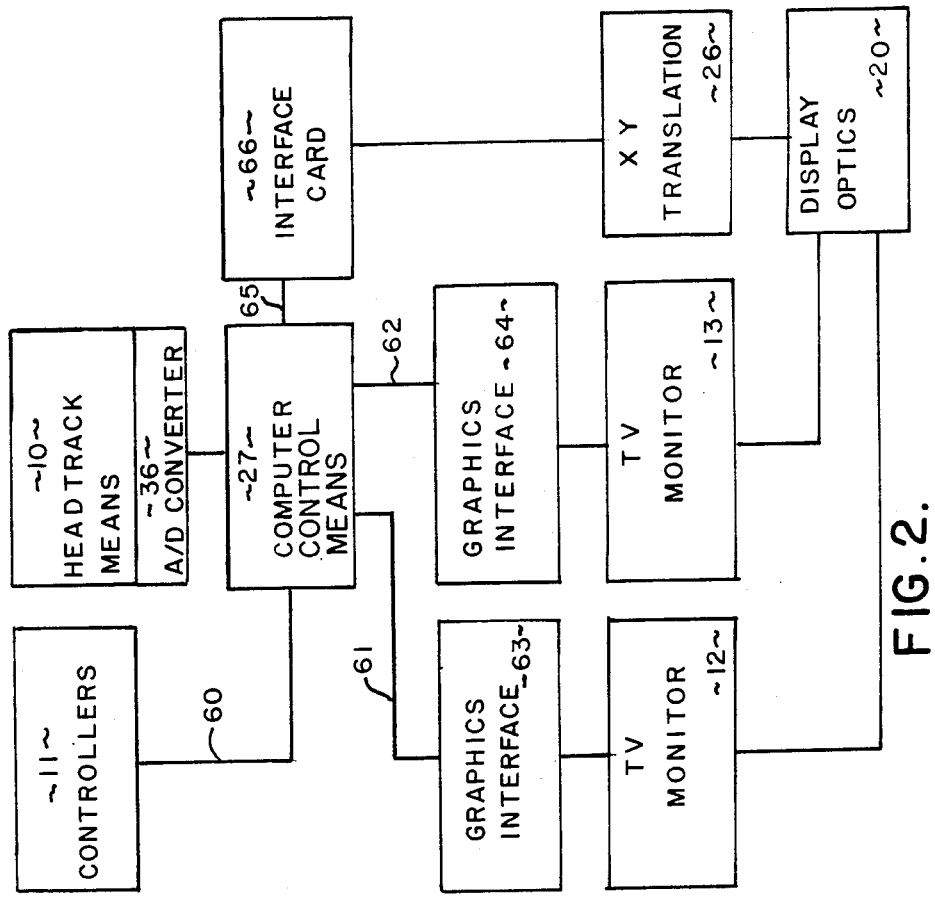
FIG. 2 is a block diagrammatic view of the display system shown in FIG. 1.

The aperture control means 23, as indicated above, includes a pair of rectangular sheet polarizers 21 and 22, which are mounted in side-by-side relationship with respect to one another. The polarizers 21 and 22 are located in a horizontal plane. The interface line between the polarizers 21 and 22 is in a vertical plane, horizontal and vertical being referenced to FIG. 1, which, along with FIG. 2, is rotated ninety degrees from the other drawing views. The polarizer 21 passes only horizontally polarized light. The polarizer 22 passes only vertically polarized light. The polarizer 21 is located to the left of the polarizer 22, a placement not readily apparent from FIG. 1, but is readily apparent in FIG. 1B. The polarizers are mounted in a suitable frame which is movable in the path 20 and controlled by a translation stage 26. The frame, and consequently the polarizers, can be moved in two degrees of freedom, up/down, left/right, when the enclosure 2 is viewed from the front wall 5 side.

The image generators 12 and 13, the aperture control means 23, and the display optics of the image projection system 3 all function together to project a stereoscopic TV image to the viewer.

The image of the aperture control means 23 is formed at an observer's head position area 28, shown in phantom lines in FIG. 1, through the combined action of the lenses 24 and 9 and through the proper position of the aperture control polarizers 21 and 22. The position of the respective control polarizers is chosen so that the right eye of the observer sees an image of the image generator 13, while the left eye sees an image of the image generator 12. That is to say, the left eye does not see the display of the image generator 13, and the right eye does not see the display of the image generator 12. Positioning of the aperture control means 23 is accomplished by a computer control means 27. The computer control means 27 receives inputs from the observer tracking means 10 and determines the viewer or observer head position within the area 28. The computer 27 in turn controls the translation stage 26 so as to position the aperture control means 23 such that the display optics relay lens 24, mirror 25 and lens 9 form the image of the aperture control polarizers 21 and 22 so that an image of the polarizer 21 is formed on the right side of the observer's face and over his right eye while an image of the polarizer 22 is formed on the left side of the observer's face and over his left eye. The polarizers 21 and 22 are moved up, down, left and right based on a determination made by tracking or following the observer's head position. Consequently, the image presented to an observer always is adjusted for head position of the observer.

Figure 3A:
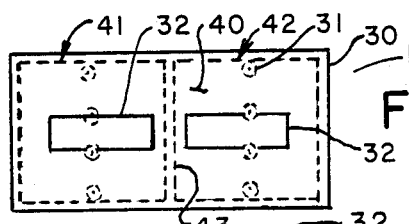
FIG. 3A is a top plan view of the tracking device employed in conjunction with the embodiment shown in FIG. 1.
Figure 3B:
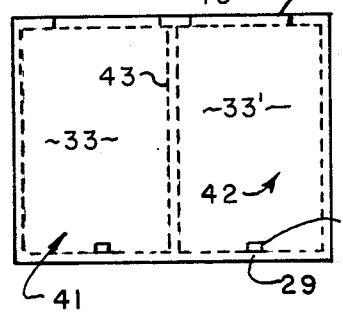
FIG. 3B is a view in side elevation of the tracking device shown in FIG. 3A.
Figure 4:
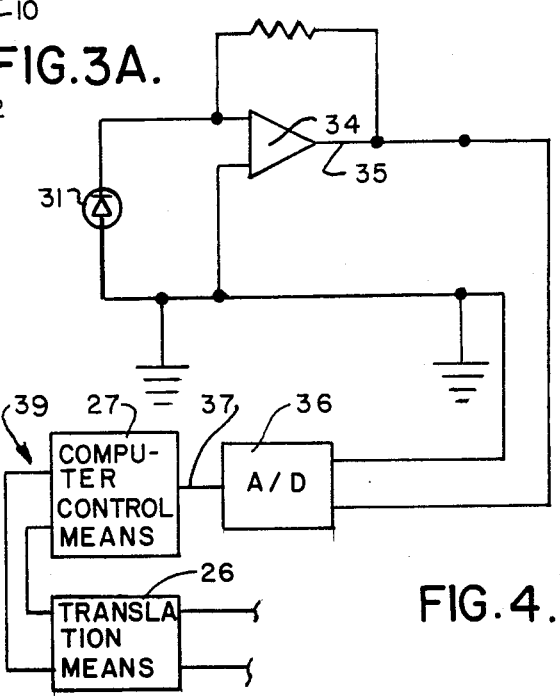
FIG. 4 is a block diagrammatic view of one individual cell utilized in the tracking device of FIGS. 3A and 3B.
Figure 5:
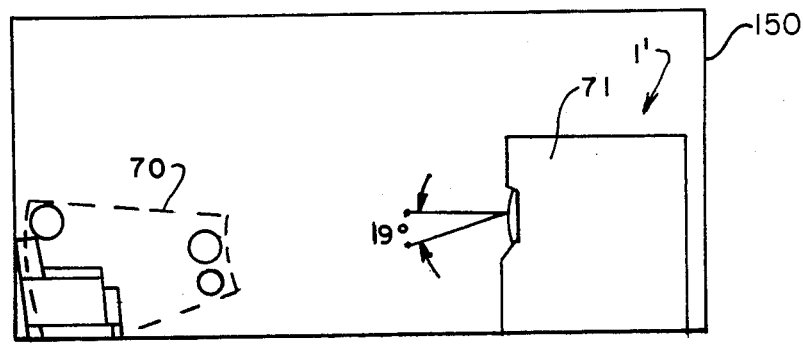
FIG. 5 is a view in side elevation of a second illustrative embodiment of display system of this invention.
Figure 6:
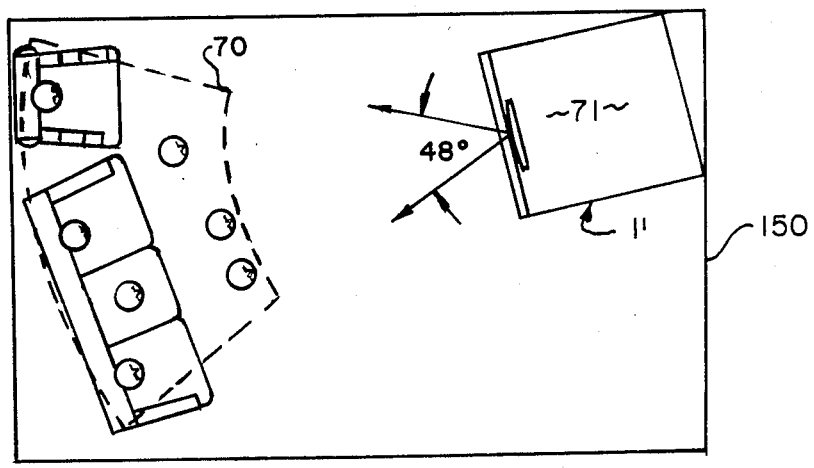
FIG. 6 is a top plan view of the display system shown in FIG. 5.

Observer head position is tracked by the tracking means 10, best described in relationship to FIGS. 3A, 3B and 4. The tracking means 10 preferably is a plurality of light sensitive diode cells which are monitored to determine observer position in a predetermined field in view. The left and right image scene perspective is adjusted to accommodate observer positions within that field of view as those positions change as sensed by the tracking means 10. The tracking means 10 includes an enclosure 30 having a plurality of photodiode detectors 31 mounted along a bottom wall 29 of the enclosure 30.

The detectors 31 are arranged in two rows or columns, 41 and 42, respectively. The rows 41 and 42 are separated by a wall 43. The wall 43 together with the enclosure 30, defines a pair of chambers 33 and 33'. A pair of elongated, light admitting ports 32 are positioned in a top wall 40 of the enclosure 30, one on each side of the wall 43. The light admitting ports 32 are intended to admit background light to the respective chambers 33 and 33' of the enclosure 30.

The photodiode detectors 31 are conventional, and develop an electrical signal which forms an input to an amplifier 34, shown in FIG. 4. Amplifier 34 has an output side 35 forming an input to an analog-to-digital (A/D) converter 36. The analog-to-digital converter 36 has an output side 37 forming an input to the computer control means 27. The computer control means 27 has an output side 39, which forms an input to the translation means 26.

The device of FIG. 1 is designed to be used in an area having a brightly lit ceiling of generally uniform intensity. An optional light source 38 may be provided within the enclosure 1 to provide a reflected light background above the area 28, to enhance the tracking ability of the tracking means 10. That is to say, some environments of the display system 1 may require use of optional light source 38 in order to permit the tracking means 10 to function properly. In other environments, however, the ambient light conditions may be such that the light source 38 is not required.

The adoption of the display system 1 of this invention to an arcade game, for example, is best illustrated in FIG. 2. As thereshown, the computer control means 27 can be programmed to provide the desired game for display at the image generators or monitors 12 and 13. The control device or devices 11 are interconnected to the computer control means 27 by a suitable connection 60. The computer control means 27 in turn has an output 61 and an output 62 operatively connected, through suitable interface cards 63 and 64, respectively, to the image generators 12 and 13 which control image generation on those devices. The image generators 12 and 13 in turn project the image through the display optics, along the path 20. As indicated above, the path 20 passes through the aperture control means 23, which is adjusted by the translation stage 26. The computer control means 27 has an output 65 which interacts with a suitable interface card 66 to control the translation system 26. The output signal of the tracking means 10 is converted to a digital value through an analog-to-digital converter 36. The output of the converter 36 forms an input to the computer 27. Computer 27, in turn, controls the operation of the translation system 26.

A second embodiment of this invention is illustrated in FIGS. 5, 6, 7 and 8. A more conventional TV type display system 1' providing stereoscopic images to a display area 70 of a room 150 is diagrammatically shown in FIGS. 5 and 6. The display system 1' includes a display means 71 which appears to an observer in the area 70 as a conventional TV enclosure, although the enclosure is somewhat enlarged over what one would expect with a single raster scan display.

Figure 7:
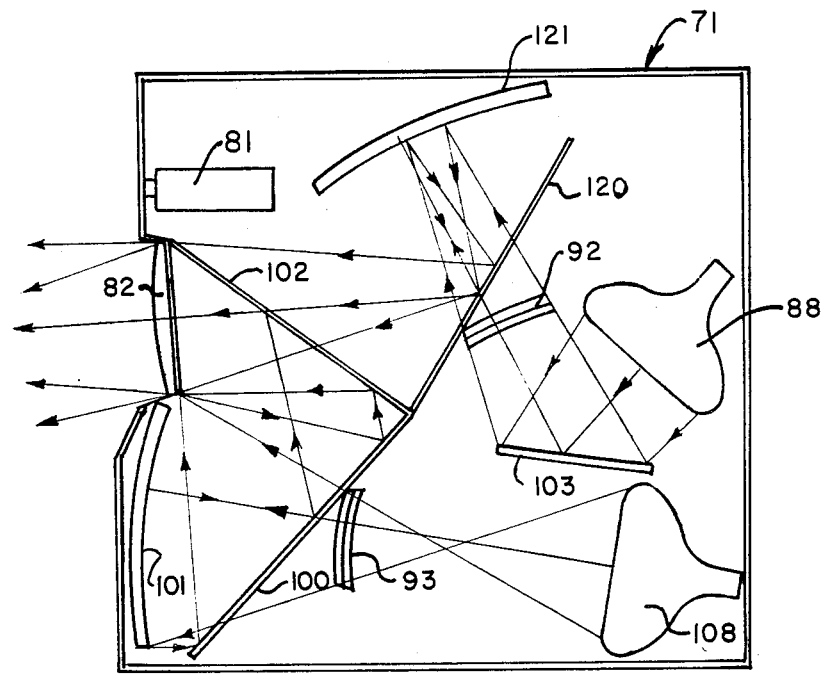
FIG. 7 is a view in side elevation, of the display system shown in FIG. 5, a side panel of the device being removed for illustrative purposes.
Figure 8:
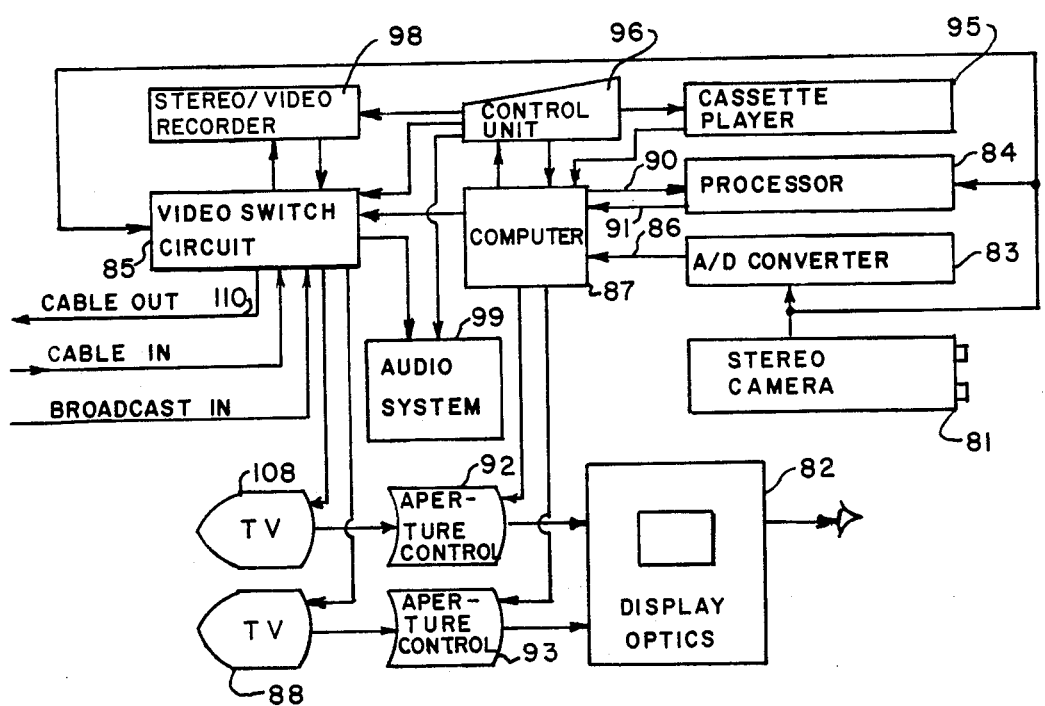
FIG. 8 is a block diagrammatic view of the display system shown in FIGS. 5 and 7.

FIG. 7 is a view of the display means 71, shown with one side removed for illustrative purposes. As thereshown, a stereo camera 81 is mounted above a display lens 82. The camera 81 consists of two standard video cameras aligned parallel to one another, but their optical axes separated by a predetermined horizontal spacing. The respective output channels of the stereo camera 81 generate synchronous video images within a predetermined field of view in a standard raster format. The video signals from the stereo camera 81 are sent to an analog-to-digital converter 83, best seen in FIG. 8. The signals are also sent to a processor 84 and to a video switch circuit 85. The areas viewed by the camera 81 include the entire stereoscopic viewing area 70 depicted in FIGS. 5 and 6. Consequently, each stereo camera video image includes images of all of the observers that are viewing the stereoscopic TV display at a particular moment in time.

The analog-to-digital converter 83 accepts one channel of video from the camera 81 and converts the signal input to a digital signal which is sent to a computer or microprocessor 87 along an output 86. The processor 87 stores the stereo camera video input in a random access memory. The digitized video is stored within the memory of the processor 87 in a manner that results in a digitally reproduced image of the objects and viewers that occupy the stereoscopic viewing area 70. Information stored in the memory is updated with new digitized video once per TV frame time. Each bit word within the memory array corresponds to the scene brightness of a unique area approximately one half inch square located approximately eleven feet in front of the display lens 82. At this magnification, the digitized image of an average viewer's face is stored in a 16×24 element section of the array.

A digital correlation processing technique is used to detect and locate the viewer images within the digitized stereoscopic viewing area data. A digitized image of a reference face which is stored in a read only memory array, is compared on an element by element basis to the digitized viewing area image data. The level of correlation between the reference face image in each block of viewing area image is computed from this element by element comparison.

If the correlation level for any block does not exceed a predetermined minimum level, then it is assumed that no viewer image is centered within that block of imagery. A new block of imagery is then selected for comparison. Selection of the image block follows a pattern defined under processor 87 control so that all parts of the stereoscopic viewing area image are examined on a regular basis.

If the correlation level for any image block exceeds a predefined minimum value, then the microprocessor assumes that the center of a viewer image is centered near the center of that block. Subsequently, correlation computations are preformed on all nearby blocks of imagery. Correlation levels are compared in order to locate a local correlation high point within the array. The location of the array block within which this correlation maximum occurs, denotes the center of a viewer image, and is stored in memory at the computer 87. After locating a viewer image, the microprocessor reverts to the correlation processing mode in which it searches for additional viewer images in those portions of the viewing area image where no viewer images are known to be located. The entire search correlation process is carried out on a second priority basis.

A correlation tracking program updates the stored location for each viewer image that has been recognized through the search correlation process. This correlation tracking program runs on a first priority basis within the computer 87. The correlation tracker performs correlation computation on blocks of imagery in the immediate vicinity of each previously determined viewer location Correlation levels are compared and an updated viewer location is computed for each viewer. If correlation levels drop below a predefined minimum level, it is assumed that the viewer is no longer in the viewing area, and that viewer location is dropped from the viewer location list. Tracking computations for each viewer are performed once each TV frame time.

The processor 84 is used to measure the distance from each viewer to the display lens 82. These measurements can be performed because the configuration of the camera 81 results in two different video signals from which scene range information can be extracted. The video signals from the two TV cameras differ because the optical axis of the two cameras are offset by a predetermined distance and thus have differing perspectives of the stereo viewing area 70. This perspective difference is manifested in a time delay in one video signal with respect to the other. This time delay varies as a function of the distance between the stereo camera 81 and the position of any object that is being imaged by the stereo camera 81.

The processor 84 accepts viewer location inputs from the computer 87 along an input 90. These inputs are used to set gates on the input signals from the camera 81. That part of each raster line, from each of the two camera video channels, which is video from a viewer facial image, is gated into the analog processor delay and correlation circuitry. The stereo TV camera video from channel 1 is branched onto five delay lines, each imparting a different delay to the signal. The five resulting channel 1 video signals are each delayed with respect to and correlated with the channel 2 video signal. When a viewer is more than twelve feet from the display lens 82, the correlation level between the channel 1 video signal with the shortest time delay and the channel 2 video signal is greater than the correlation level between the channel 2 video signal and the other four delay channel 1 video signals. Each of the five time delays is chosen to produce maximum correlation between the stereo TV camera 81 video signals when a viewer is at a different predetermined range from the display lens 82.

The range gate within which each viewer is located is converted to digital format and returned to the computer 87 along an output 91. The information is stored in the computer 87 with the corresponding viewer location computed earlier. The viewer location information is provided to first and second aperture control means 92 and 93, respectively.

The computer 87 also is connected to a control unit 96 and to a cassette tape player 95. The control unit 96 contains all of the controls needed to operate the stereo TV display, and optionally may include a keyboard for communication with the computer 87. Preferably, the control unit 96 is movable to the display area 70 so that the display 1' can be controlled from the viewing area. Various programs that can be run on the computer 87, for example, games and the like, are stored on the cassette player 95. This information then can form an input to the microprocessor by operation of the control unit 96. While a cassette player is described, a conventional disc drive may be employed, if desired, either in place of or in addition to the cassette player 95. The input switch circuitry 85 also is controlled from the control unit 96. The switch circuitry 85 controls the selection of video received from a stereo video recorder/player 98, the computer 87, cable TV, broadcast TV and stereo TV camera input channels. It also contols the selection of video output sent to the stereo recorder 98, a cable TV output 110 and the output to a pair of stereo TV display monitors 108 and 88, respectively. The stereo recorder/player 98 can simultaneously record or playback two channels of synchronized video. As indicated, the stereo recorder 98 is controlled from the control unit 96. Although stereo video recorder/player 98 is not an essential element for stereoscopic TV display, it does increase the flexibility of the system in a number of ways.

An audio system 99 employed in conjunction with the embodiment of FIGS. 5-8 is similar to that used in commercially available home TV sets. Earphone attachments can be provided, if desired, to permit two viewers to watch and listen to different broadcast TV programs simultaneously. The audio system 99 preferably is controlled from the control unit 96.

The displays 108 and 88 are similar to and may comprise standard color TV monitors. The monitors, however, must produce high brightness images to compensate for the light transmission inefficiencies of the display optics, and the aperture controls 92 and 93.

Each aperture control 92 and 93 contains three large liquid crystal displays. These liquid crystal displays are of a type whose segments are transparent when no voltage is applied to those segments. However, those segments become opaque when there is an application of a voltage. Each spherically shaped liquid crystal display is comprised of many long, narrow, vertical segments. When voltage is applied to all the elements of a display, it appears entirely opaque. The three liquid crystal displays within each aperture control are controlled by signals sent from the computer 87. These command signals are derived from the three-dimensional viewer locations stored within the computer 87.

The displays 108 and 88, the aperture controls 92 and 93, and the display optics shown in FIG. 7 all function to project a stereoscopic TV image to each viewer in the viewing area. The light passed from the raster scans 108 and 88 and the transmission path are shown diagrammatically in FIG. 7.

Stereoscopic projection is achieved in the following way. The display from the monitor 108 projects a TV picture that has the correct perspective required for stereo viewing when viewed through the left eye of each observer. Each light ray from display monitor 108 either passes through the transparent segments in the aperture control 93 or is blocked by the opaque segments of aperture 93. The light that passes through the aperture control 93 encounters a beam splitter 100 that reflects 50% of the light and transmits the other 50%. The light which is transmitted strikes a concave reflective mirror 101, and is directed back toward the beam splitter 100. Once again, 50% of the light is transmitted and 50% reflected by the beam splitter 100. The light that is reflected strikes a second beam splitter 102, where 50% of the remaining light is reflected and 50% transmitted. That light which is reflected by the second beam splitter 102 passes through the display lens 82 toward the viewing area.

An image of the display monitor CRT 108 is formed at the display lens 82 by concave mirror 101. Images of the aperture control liquid crystal displays are formed in the viewing area by the combined action of the concave mirror 101 and the display lens 82. An image of one liquid crystal display segment is formed a predetermined distance in front of the display lens 82, and an image of the second liquid crystal display segment is formed at another distance in front of the display lens 21. An image of a third liquid crystal display segment is formed at a third distance in front of the display lens 82. The transmission or opacity of each segment within each of the aperture control 93 liquid crystal displays is controlled to create the condition wherein only the left eye of each observer within the stereo TV area sees an image of the TV picture formed on the TV display 108.

The light passed through a second light transmission path of the display system 1' is substantially similar to that just described. The TV display 88 projects a TV picture in the correct perspective required for stereo viewing when viewed by each observer's right eye. Light from the display 88 strikes a folding mirror 103 and is reflected into aperture control 92. Light that passes through aperture control 92 encounters a beam splitter 120. The light that passes through the beam splitter 120 is reflected from a concave mirror 121 and back to the beam splitter 120. The light that is subsequently reflected from the beam splitter 120 strikes the beam splitter 102. The light that passes through the beam splitter 102 encounters display lens 82 and is directed into the stereo display viewing area 70. An image of the TV display 88 is formed at the display lens 82 by the concave mirror 121. Images of the liquid crystal displays that comprise aperture control means 92 are formed at predetermined distances from the display lens 82. The transmission or opacity of each segment within each aperture control liquid display crystal is controlled to create the condition wherein only the right eye of each observer within the viewing area 70 sees an image of the TV picture formed by the display 88. That is to say, the left eye does not see the TV display on CRT 88 and the right eye does not see the TV displayed on the CRT 108.

It should be noted that with the system thus described, one confusing situation can occur. When two viewers position themselves so that one viewer is viewing the display lens 82 by viewing it directly over the head of the other viewer, it is impossible to display stereoscopic imagery to both viewers with the system shown. It is possible to correct this design deficiency by increasing the complexity of the liquid crystal displays forming the operations 92 and 93. A two dimensional matrix of liquid crystal display elements would be required. Other alternate approaches will occur to those skilled in the art.

By using a modified aperture control technique, it is also possible to display only a single TV image to both eyes of some viewers while displaying a second different TV display image to both eyes of other viewers that are within the viewing area in front of the display lens 82. By using this technique, it is possible to display two unrelated broadcast programs or other video scenes to viewers using a single TV display system of this invention.

Numerous variations, within the scope of the appended claims, will be apparent to those skilled in the art in view of the foregoing description and accompanying drawings. Thus, it is apparent that the embodiment shown in of FIGS. 1-4 accomplishes the same result in substantially the same way as the embodiment shown in FIGS. 5 through 8, but does so at substantially reduced cost. However, the embodiment of FIGS. 1-4 is single viewer oriented. Consequently, it is particularly well adapted to video arcade displays. While certain of the elements in the display optics system are described as lenses, it will be appreciated that the lenses may comprise any of a variety of lens types. For example, the drawings illustrate concave and convex lenses. However, fresnel lenses may be employed, if desired. While the invention has been described with respect to entertainment devices, those skilled in the art will recognize that the invention has a variety of applications, including medical display systems, aircraft cockpit simulator display systems, and manned flight simulation displays, for example. These variations are merely illustrative.

Having thus described the invention, what is claimed and desired to be secured by Letters Patent is:

1. A display system, comprising:
   first image generating means adapted to provide a desired image;
   second image generating means adapted to provide a desired image;
   means for projecting the images generated by said first and said second image generating means along at least one predetermined path toward an observer;
   control means in said at least one path for adjusting the images projected along said path depending upon the position of said observer;
   means for monitoring the position of said observer and for generating an electrical signal in response to said position; and
   means for adjusting said control means in said at least one path based on said electrical signal, said last mentioned means being operatively connected to said position maintaining means.

2. The display system of claim 1 wherein said first and second image generating means comprise CRT devices.

3. The display system of claim 2 wherein said means for projecting said images along at least one path comprises a first mirror arranged to reflect said image toward a beam splitter;
   a beam splitter adapted to project said first and second images toward a set of lenses and toward an observer; and
   a second mirror in the path projected by said beam splitter, said mirror being adapted to project the image received from said beam splitter toward a display lens.

4. The display system of claim 3 wherein said means for monitoring the position of an observer includes a plurality of sensors responsive to electromagnetic wave energy operatively connected to a computer, and a computer having an input side and an output side, the input side of said computer being operatively connected to said sensors.

5. The display system of claim 4 wherein said position maintaining means comprises translation means operatively connected to drive a pair of polarizers in at least two coordinate directions in response to the monitored position of an observer.

6. The display system of claim 2 further including means for projecting said first and second generated images along at least two predetermined paths toward an observer, said paths meeting at a display lens.

7. The display system of claim 6 wherein said means for monitoring the position of an observer includes a stereo video camera adapted to scan an observer viewing area operatively connected to a computer, and a computer including a memory for storing video images of said viewing area.

8. The display system of claim 7 further including control unit means for operating said computer, said control unit means being operable from a viewing area of said display means.

9. The display means of claim 8 wherein said control means in said at least two paths comprises liquid crystal display means responsive to an applied electrical signal for controlling the light transmissability of said liquid crystal displays, said liquid crystal displays being electrically connected to said computer.

10. A display system, comprising:
first image generating means for providing a first desired image;
second image generating means for providing a second desired image;
means for projecting the first and second images generated by said first and said second image generating means along at least one predetermined optical path toward an observer;
control means in said at least one path for adjusting the images projected along said path based upon the position of said observer;
means for monitoring the position of said observer and for developing an electrical signal in response to said position; and
means for operating said control means in said at least one optical path based upon said electrical signal, said last mentioned means being operatively connected to said position maintaining means.

11. The display system of claim 10 wherein said first and said second image generating means comprise CRT devices.

12. The display system of claim 10 wherein said means for projecting said images along said at least one path comprise
a first mirror arranged to reflect said image toward a beam splitter;
a beam splitter adapted to project said first and said second images toward a set of lenses and toward an observer; and
a second mirror in the path projected by said beam splitter, said mirror being adapted to project the image received from said beam splitter toward a display lens.

13. The display system of claim 12 wherein said means for monitoring the position of an observer includes a plurality of sensors responsive to electromagnetic wave energy operatively connected to a computer, and a computer having an input side and an output side, the input side of said computer being operatively connected to said sensors.

14. The display system of claim 13 wherein said position maintaining means comprises X and Y translation means operatively connected to move a pair of polarizers in X and Y of a cartesian coordinate system in response to the monitored position of an observer.

15. The display system of claim 13 further including an electromagnetic wave energy source for providing ambient electromagnetic wave energy for said plurality of electromagnetic wave energy responsive sensors.

16. The display system of claim 15 wherein said position monitoring means further includes an enclosure divided generally into first and second chambers, first and second light ports communicating respectively with said first and said second chambers and positioned so as to be receptive to said ambient electromagnetic wave energy; and
said plurality of sensors being mounted in first and second columns in respective ones of said first and second chambers.

17. The display system of claim 16 further including means for converting an analog output of said sensors to a digital value operatively connected between said sensors and said control means.

18. The display system of claim 10 further including means for projecting said first and second generated images along at least two predetermined paths toward an observer, said paths meeting at a display lens.

19. The display system of claim 10 wherein said means for monitoring the position of an observer includes a stereo video camera adapted to scan an observer viewing area operatively connected to a computer, and a computer including a memory for storing video images of said viewing area.

20. The display system of claim 19 further including control unit means for operating said computer, said control unit means being operable from a viewing area of said display means.

21. The display system of claim 20 wherein said control means in said at least two paths comprises liquid crystal means responsive to an applied electrical signal for controlling the light transmissability of said liquid crystal displays, said electric display being electrically connected to said computer.

22. The display system of claim 21 further including video switch means operatively connected to said control unit, said video switch means being adapted to connect monitors to a source of commercial broadcasts.

23. A method of providing a three dimensional view to an observer comprising the steps of:
generating a first image for projection toward a first eye of the observer;
generating a second image for projection toward a second eye of an observer;
monitoring the position of the observer; and
changing the projected image perspective as a function of observer position.

* * * * *